Nov. 16, 1971   R. K. DAVIS   3,620,010
GAS TURBINE SPEED-LOAD CONTROL
Filed Feb. 2, 1970   2 Sheets-Sheet 1

INVENTOR.
RICHARD K. DAVIS

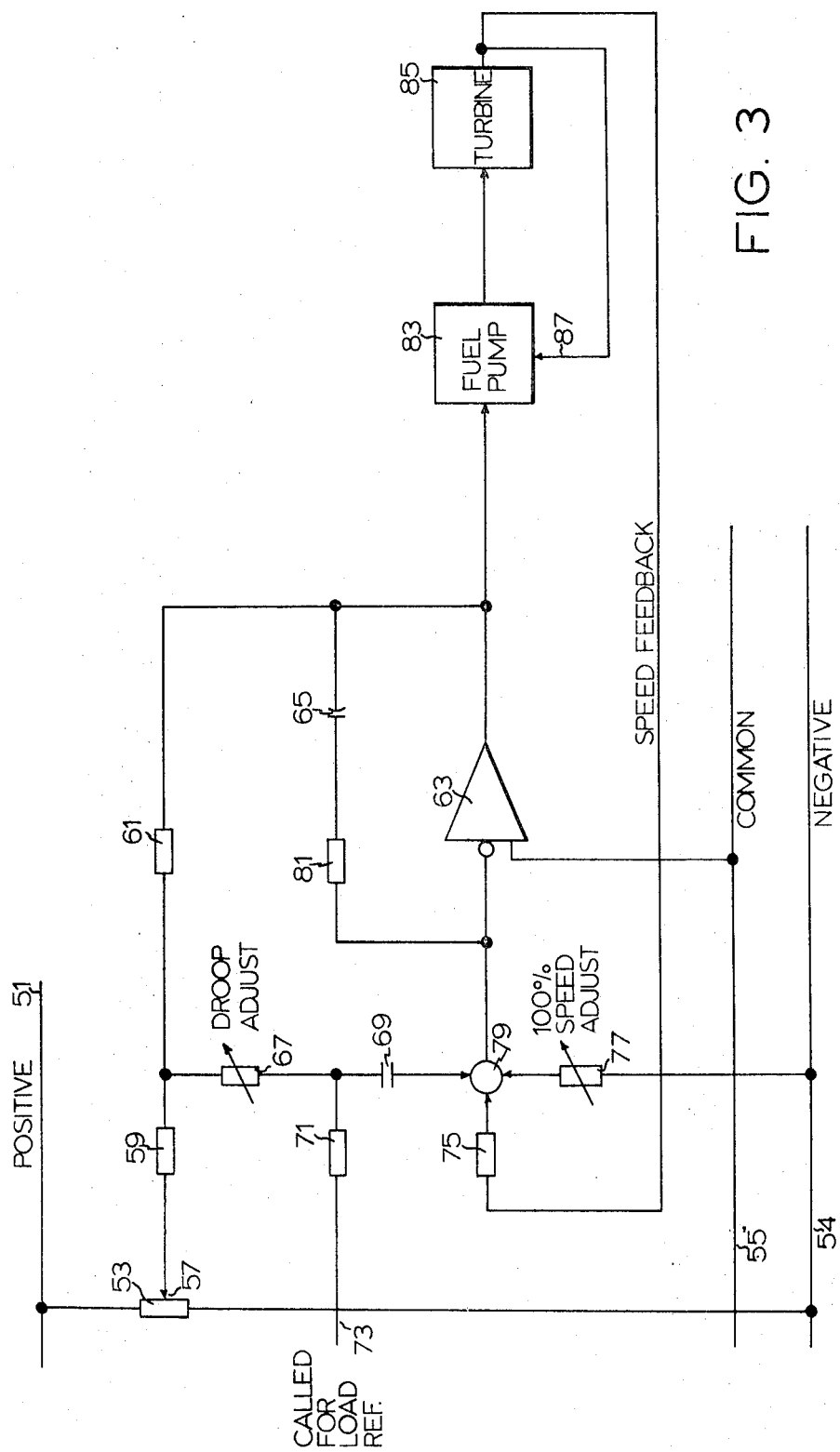

United States Patent Office 3,620,010
Patented Nov. 16, 1971

3,620,010
GAS TURBINE SPEED-LOAD CONTROL
Richard K. Davis, Roanoke, Va., assignor to
General Electric Company
Filed Feb. 2, 1970, Ser. No. 7,788
Int. Cl. F02c 9/06
U.S. Cl. 60—39.28
2 Claims

ABSTRACT OF THE DISCLOSURE

A circuit for controlling the speed-load characteristics of a gas turbine including a summing punction for algebraically adding a speed reference signal and a speed feedback signal and applying the sum thereof to an operational amplifier, the output of which controls fuel flow to the turbine for maintaining constant speed. A resistor for modifying the output of the operational amplifier is connected to a second summing junction where the modified output is added to a second reference signal representing desired loading of the turbine and a switch which when closed applies the sum of the second summing junction to the sum of the first summing junction whereby fuel flow to the turbine is controlled as a function of load.

BACKGROUND OF THE INVENTION

In situations where two or more turbines provide energy to one system, such as in a power distribution system where a main generator and one or more booster generators supply electrical power to a distribution system, the main generator always runs isochronously; i.e., it is controlled to run at a constant speed without regard to the load which is being applied. If however the load applied to the generator exceeds its capacity, additional generators must be used to add power to the system to satisfy the demand thereupon.

Thus, for example, a main generator driven by a steam turbine supplies power to a system having one booster generator. The main generator is controlled to run at a speed which maintains the alternating current frequency constant.

The load on the system is such that the booster generator is loaded 50%. This is accomplished by running the booster generator under "droop" conditions. Droop control is a form of speed control wherein the speed of the turbine is controlled as a function of load. In a distribution system the main generator, being controlled isochronously, causes the booster generator, controlled in droop mode, to lock in step as if mechanically coupled to the main generator. The speed of the booster generator is therefore fixed by the speed of the main generator and as such is also constant.

The fuel supply to the turbine driving the booster generator may be regulated whereby the load level thereof may be controlled. For example, if the load of the booster generator should be increased, fuel flow to the turbine must be increased. This tends to increase the speed of the turbine which, however, is locked in step with the main generator and as a consequence thereof cannot increase speed. Since additional fuel is now being applied to the booster turbine, additional load is now accepted by the booster generator. Assume now that the load level on the network remains constant so that the additional load accepted by the booster generator must be withdrawn from the main generator thereby causing the main generator to tend to increaes speed.

The control of the main generator is however isochronous so that speed must remain constant. The control of the main turbine therefore will reduce fuel flow thereto tending to reduce the speed. The quantity of fuel flow therefore has been transferred from the main turbine to the booster turbine without change in speed.

If now the booster generator must supply power to an isolated portion of the network such as may occur when power lines are severed, the booster generator in effect becomes the main generator for that portion of the network and thus should run isochronously in order to maintain speed independent of loading. It is therefore desirable to provide the ability for switching the control of the turbine from the isochronous to droop mode.

In the past this function has not been practicable and it has been necessary to control the turbine manually in order to maintain constant speed.

SUMMARY OF THE INVENTION

To overcome the problem the present invention provides an apparatus for controlling (automatically) the speed load characteristics of a turbine. A speed reference signal representing desired speed of the turbine is algebraically added to a speed feedback representing actual speed of the turbine resulting in a sum which is applied to the input of an operational amplifier. The output of the amplifier is applied to a control for regulating fuel flow to the turbine whereby the speed thereof is maintained constant. The output of the operational amplifier is modified and applied to a second summing junction where it is algebraically added to a second reference signal representing the desired load acceptable by the turbine. A switch when closed provides a connection which allows the sum of the second summing junction to be added to the sum of the first summing junction which results in control of the turbine as a function of load.

A third reference signal representing speed of the turbine at no load may be applied to the second summing junction whereby the turbine speed is controlled while running independently of the network preparatory to connecting thereto.

Adjustment of any of the reference signals and feedback signal may be made without effecting conditions established by the other modifying input signals.

DESCRIPTION OF THE DRAWINGS

FIG. 3 shows a turbine control providing means for switching the mode of a gas turbine control from isochronous to droop and inversely from droop to isochronous.

DETAILED DESCRIPTION

Figure 1:
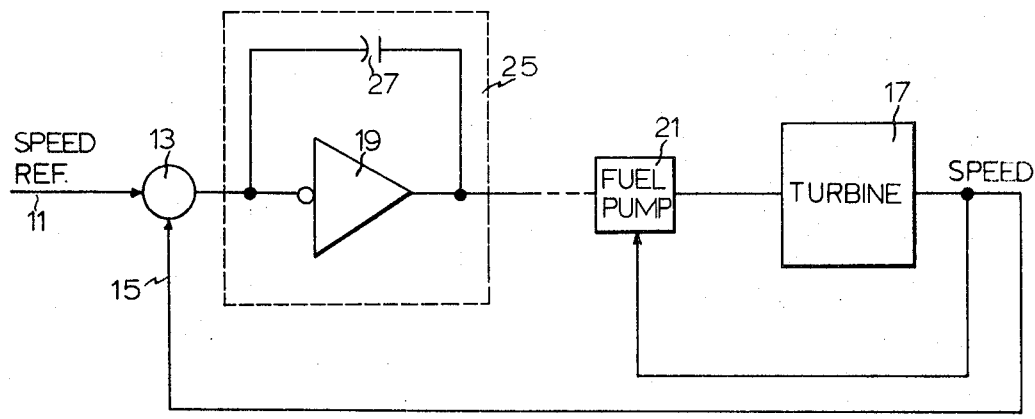
FIG. 1 is a block diagram showing principles of isochronous control of a turbine.

Referring now to FIG. 1 wherein a speed reference signal 11 is applied to a summing junction 13 which also receives a feedback signal 15 denoting speed of a turbine 17. Signals 11 and 15 are opposing in polarity causing their algebraic sum to provide a speed control of the turbine in order to balance the speed set by the reference signal 11 against the speed feedback signal 15. FIG. 1 shows a typical isochronous speed control of a gas turbine wherein the speed is set by a reference signal 11 and maintained at that speed without regard to the load applied to the turbine. Thus if no change in load applied to the turbine occurs, the speed feedback signal 15 will cancel the speed reference input signal causing the input to the operational amplifier 19 to be zero, resulting in a steady output of the operational amplifier 19 causing the fuel pump 21 controlled by the operational amplifier 19 through a series of controls (not shown) to remain at a predetermined operational level. Note that the output of amplifier 19 is therefore proportional to load on the turbine.

If the load applied to the turbine is increased, the speed thereof tends to reduce thereby causing the voltage of reference signal 11 to dominate over the feedback signal 15 thus creating an unbalance at summing junction 13 and the input of operational amplifier 19. Assume now that the speed reference signal 11 is negative, the feedback signal 15 therefore must be positive, hence in the example above, the input to the operational amplified 19 will become more negative when speed of the turbine reduces due to loading. The characteristics of operational amplifier 19 are such that the output thereof becomes more positive when the input becomes more negative causing fuel pump 21 to increase fuel application to the turbine 17. The fuel pump is normally attached to the drive shaft of the gas turbine so that an increase in speed of the turbine will increase the fuel input to the turbine correspondingly; i.e., the output of the fuel pump is related to the speed of the turbine as if in response to a feedback signal from the turbine indicated by feedback arrow 23. The additional fuel applied to the turbine tends to increase the speed thereof in order to overcome the effects of losses within the turbine until the feedback signal 15 again balances the speed reference signal 11 at which time the input to the operational amplifier 19 is again reduced to zero. The capacitor 27 connected in feedback around the operational amplifier 19 prevents steady state signals from the output of the amplifier to be fed back to the summing junction 13. Only the transient changes in the output signal are fed back through capacitor 27 so that the speed control of the turbine is insensitive to changes in load on the turbine.

Figure 2:
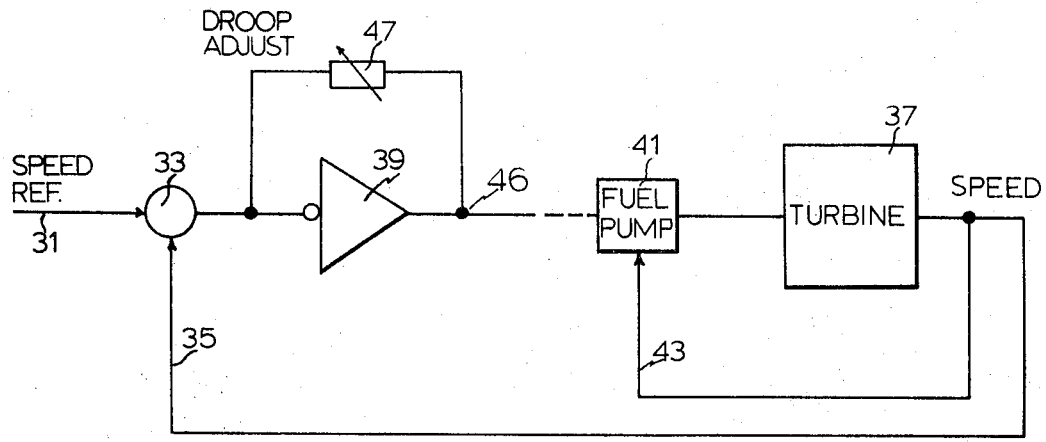
FIG. 2 is a block diagram representing the droop mode of control for a turbine.

Referring now to FIG. 2 showing a block diagram of a droop circuit control for a gas turbine. This type of control is used wherever the loading of a turbine must be controlled. The reference input signal 31 is applied to summing junction 33 which in addition thereto receives a speed feedback signal 35 from an apparatus such as a tachometer (not shown) mounted on the output shaft of turbine 37 and a load feedback signal 46 through resistor 47. The signal 31 is in opposition to the feedback signals 35 and 46 so that the speed of the turbine is equal to the algebraic sum of the reference signal 31 and the feedback signals 35 and 47 which is approximately zero during steady state conditions. Assume now that the speed reference input signal 31 is negative in polarity causing the turbine to run at a predetermined speed under load conditions existing. If now, for example, the load applied to the turbine increases, the speed of the turbine tends to reduce thereby causing the speed feedback signal 35 to reduce in value. The summing junction 33 therefore becomes more negative resulting in a more positive output signal 46, which feeds the summing junction through feedback resistor 47. Since the speed of the turbine is the resultant of the algebraic sum of the three signals forming the input to the operational amplifier 39, the speed will have changed as a result of the load change when the algebraic sum has again returned to zero because of the added contribution through resistor 47.

In conditions where load sharing is necessary such as in electrical power distribution systems, a main generator driven by a steam turbine for example is controlled to maintain speed without regard of the load placed on the turbine. Booster generators driven by gas or steam turbines are placed into use as the demand for power is increased and possibly exceeds the capacity of the main generator. In order to maintain constant speed the steam turbine of the main generator is controlled isochronously using circuitry described in FIG. 1. The speed of the gas turbine of the booster generator is controlled by droop speed control circuitry shown in FIG. 2. Referring now to FIGS. 1 and 2 assume that both turbines are on the line; i.e., connected to the same distribution system, the booster generator being of lower capacity than the main generator will run at a speed which is synchronous to the speed of the main generator since the two generators are locked in step as if they were connected together by a common shaft. Since the speed of the main generator is constant, the speed of the booster generator is therefore constant causing the speed feedback signal 35 to be constant. There are thus only two variable signals effecting the performance of the booster generator turbine: (1) the speed reference signal 31 and (2) the load feedback signal 46 through droop resistor 47. If, for example, the speed input signal 31 to the booster turbine speed control is increased, the fuel input to the turbine is increased, which tends to increase the speed of the turbine. However, since the generators are locked together no increase in speed can occur. The additional fuel however causes the booster turbine-generator to accept more load since the turbine now develops more power. Assuming now that the load applied to the system is constant, the main generator now is being relieved of some of the load applied thereto and tends to increase speed as a result thereof. The speed feedback signal 15 increases as a result thereof causing an unbalance at the input of the operational amplifier 19. This produces the effect of reducing the fuel supply to the main turbine in order to maintain the constant speed set by the speed reference signal 11. Thus the increase in fuel applied to the booster turbine and the decrease in fuel applied to the main turbine causes some of the load to be transferred from the main generator to the booster generator.

Assume now that it is necessary that the booster generator be disconnected from the main line and must supply power to a particular area which is also isolated from the main line; i.e., it now becomes the main generator for that area. In order to keep speed constant without consideration of the load applied thereto, it is necessary that the booster turbine generator be then switched to operate isochronously rather than by droop control.

Referring to FIG. 3 which shows a circuit for switching the control of a turbine from droop mode to isochronous mode and inversely from isochronous mode to droop mode. A positive bus 51 is connected through a potentiometer 53 to a negative bus 54 thereby providing a voltage dividing circuit having an adjustable voltage level through slider 57 of the potentiometer 53 which connects to resistor 59. Resistor 59 connects through resistor 61 to the output of operational amplifier 63 and to capacitor 65. Resistor 59 connects through adjustable resistor 67 and through interlock 69 to summing junction 79 and also connects to resistor 71 which receives a "called for load" reference signal 73. Interlock 69 connects to speed feedback resistor 75 and to adjustable resistor 77 at summing junction 79 thereby providing an input signal to operational amplifier 63. Summing junction 79 connects through resistor 81 to capacitor 65. Adjustable resistor 77 connects to negative bus 54. The output of operational amplifier 63 connects to control circuitry (not shown) of fuel pump 83 which provides the fuel to the gas turbine 85 driving a generator or the like (not shown). Since the fuel pump is directly connected to the drive shaft of the turbine, fuel input to the turbine is proportional to the speed thereof; i.e., speed feedback from the turbine and the output of amplifier 63 determine fuel input thereto. A tachometer (not shown) mounted on the turbine shaft provides a feedback signal, proportional to speed, which is applied to the summing junction 79 through resistor 75. The isochronous mode of operation results from the interlock 69 being open causing the isochronous speed reference signal representing 100% speed to be applied through resistor 77 to summing junction 79 where it is balanced against the speed feedback signal applied to the summing junction 79 through resistor 75. The feedback signal from the output of the operational amplifier 63 through capacitor 65 and resistor 81 to the input of the operational amplifier only effects the balance of the summing junction during transient conditions and has no effect on the steady state condition.

When the turbine is operated on droop control mode, interlock 69 is closed causing the "called for load" reference signal 73 to be applied to summing junction 79 through resistor 71 along with load feedback signal through resistor 61 and a bias through resistor 59, in addition to the isochronous speed reference and feedback signals.

Assume now that the isochronous speed reference signal causes the turbine to run at 100% speed, then the droop speed reference signal must add thereto in order to provide a condition of load sharing when the generator is functioning as an auxiliary or booster source in a system having a main generator. The capacitor 65 remains charged during droop operation since a potential exists across the operational amplifier so that reinstatement to the isochronous mode of operation may take place by opening interlock 69 without causing extreme surges due to momentary short circuiting of the operational amplifier 63 while capacitor 65 is recharging. Additional means for limiting shock to the system when switching from the droop mode to isochronous mode is provided by allowing the adjustment of the "called for load" signal 73 to follow load conditions existing during isochronous control mode and at the time the transfer droop to mode is made.

For example, during isolation of the turbine-generator when control of the turbine is isochronous, the load demand may have increased. If then the generator is reconnected to the system where it is required to share this load with a main generator of greater capacity and is switched to droop mode of control, fuel flow will instantly be reduced to the value set by the "called for load" reference 73. This causes considerable shock to the system. In order to prevent this the "called for load" signal is automatically adjusted to a value which corresponds to actual load held by the turbine during the isochronous mode of operation. This "called for load" signal may be held at the proper value through electronic means by comparing load feedback signal (the output signal of operational amplifier 63) to the actual "called for load" signal 73 and automatically adjusting this signal 73 to eliminate the difference. After operation of the entire system is restored and the booster generator is running in the droop mode of control, an operator may adjust droop resistor 67 and the "called for load" signal to a value where load sharing of the main generator and booster generator is at the desired level.

When load conditions are such that a booster generator must be added to the system, the generator must be synchronized with the system before being connected thereto. A signal representing the full speed, no load fuel level of the turbine is applied to the summing junction 79 through resistor 59 causing the generator to run at synchronous speed before being connected to the system; hence, the booster generator will be in step with the main generator when added to the system. The voltage dividing bridge provided by the potentiometer 53 being connected between the positive bus 51 and the negative bus 54 provides a voltage signal through resistor 59 to the summing junction which may be adjusted to provide a fuel level to the turbine which causes the booster generator to run in synchronism with the system before load is applied thereto.

The droop and "full speed-no load" levels of operation are each adjustable without effecting the other. This is accomplished by placing the droop adjustment as it is shown in FIG. 3 rather than varying resistor 61 to produce the variable droop. Variations in the droop adjust resistor 67 do not effect the output level of amplifier 63 as set by potentiometer 53 so that the full (synchronizing) speed of the turbine is independent of droop adjustment. Adjustment of the isochronous speed reference resistor 77 is independent of both the droop and "full speed-no load" settings since it feeds the summing junction directly.

While the invention has been explained and described with the aid of particular embodiments thereof, it will be understood that the invention is not limited thereby and that many modifications retaining and utilizing the spirit thereof without departing essentially therefrom will occur to those skilled in the art in applying the invention to specific operating environments and conditions. It is therefore contemplated by the appended claims to cover all such modifications as fall within the scope and spirit of the invention.

What is claimed is:

1. An apparatus for controlling the mode of operation of a gas turbine by regulating the fuel supply thereof comprising:
    (a) a fuel pump for supplying controlled quantities of fuel to the gas turbine;
    (b) an operational amplifier for puroducing a signal input to said pump to regulate the quantity of fuel supplied thereby;
    (c) a first summing junction for providing an input signal to said operational amplifier in response to selected input signals to said junction; and,
    (d) means to provide said selected input signals including
        (1) means for producing a first feedback signal of a first polarity and of a magnitude proportional to the speed of said gas turbine;
        (2) means for producing a reference signal of a second polarity and of a magnitude proportional to the desired speed of said gas turbine; and
        (3) selectively operable switching means for selectively providing a third signal which represents the algebraic sum of a second feedback signal of said second polarity and of a magnitude proportional to the output of said operational amplifier and an adjustable reference signal of said first polarity, said third signal serving to change the mode of operation of said turbine from isochronous to droop.

2. The invention claimed in claim 1 wherein the voltage of said second reference signal is automatically adjusted to a level which is proportional to load on the turbine while said second summing junction is not connected to said first summing junction.

References Cited
UNITED STATES PATENTS

| | | | |
|---|---|---|---|
| 3,139,922 | 7/1964 | Peczkowski | 60—39.28 |
| 3,164,769 | 1/1965 | Anderson | 60—39.28 |
| 3,174,284 | 3/1965 | McCarthy | 60—39.16 |
| 3,186,165 | 1/1965 | Edkins | 60—39.15 X |
| 3,478,512 | 11/1969 | Brahm | 60—39.28 |
| 3,520,133 | 7/1970 | Loft | 60—39.28 |
| 3,533,236 | 10/1970 | Cottington | 60—39.28 |

CLARENCE R. GORDON, Primary Examiner

U.S. Cl. X.R.

60—39.15

Disclaimer 3,620,010.—*Richard K. Davis*, Roanoke, Va. GAS TURBINE SPEED-LOAD CONTROL. Patent dated Nov. 16, 1971. Disclaimer filed Dec. 5, 1973, by the assignee, *General Electric Company*.

Hereby enters this disclaimer to all claims of said patent.

[*Official Gazette May 27, 1975.*]